United States Patent
Glazer et al.

(10) Patent No.: US 10,505,800 B2
(45) Date of Patent: Dec. 10, 2019

(54) METHOD FOR REAL-TIME ACTIVATION OF RECEIVER MODULE

(71) Applicant: SCREENOVATE TECHNOLOGIES LTD., Ra'anana (IL)

(72) Inventors: Joshua Glazer, Ra'anana (IL); Lior Gerenstein, Tel Aviv (IL); Tal Zarfati, Nordiya (IL)

(73) Assignee: SCREENOVATE TECHNOLOGIES LTD., Ra'anana (IL)

(*) Notice: Subject to any disclaimer, the term of this patent is extended or adjusted under 35 U.S.C. 154(b) by 195 days.

(21) Appl. No.: 14/683,307

(22) Filed: Apr. 10, 2015

(65) Prior Publication Data

US 2015/0295767 A1 Oct. 15, 2015

Related U.S. Application Data

(60) Provisional application No. 61/977,705, filed on Apr. 10, 2014.

(51) Int. Cl.
- H04L 29/06 (2006.01)
- H04L 12/24 (2006.01)
- H04W 12/06 (2009.01)

(52) U.S. Cl.
CPC ........ H04L 41/0816 (2013.01); H04L 63/083 (2013.01); H04L 65/1059 (2013.01); H04L 65/1069 (2013.01); H04W 12/06 (2013.01)

(58) Field of Classification Search
CPC ............... H04L 41/0816; H04L 63/083; H04L 65/1059; H04L 65/1069; H04W 12/06
USPC .......................................................... 709/221
See application file for complete search history.

(56) References Cited

U.S. PATENT DOCUMENTS

| | | | | |
|---|---|---|---|---|
| 9,258,704 | B2* | 2/2016 | Zucker | H04W 12/06 |
| 2007/0002752 | A1* | 1/2007 | Thibeault | H04L 1/22 |
| | | | | 370/241 |
| 2007/0058542 | A1* | 3/2007 | Thibeault | H04L 12/2697 |
| | | | | 370/230 |
| 2009/0172443 | A1* | 7/2009 | Rothman | G06F 1/3209 |
| | | | | 713/323 |
| 2010/0259388 | A1* | 10/2010 | Menzel | H04B 5/0031 |
| | | | | 340/572.1 |
| 2011/0215159 | A1* | 9/2011 | Jain | G06K 19/07739 |
| | | | | 235/492 |
| 2012/0159609 | A1* | 6/2012 | Griffin | G06F 21/36 |
| | | | | 726/17 |
| 2012/0291120 | A1* | 11/2012 | Griffin | G06F 21/36 |
| | | | | 726/19 |
| 2013/0111581 | A1* | 5/2013 | Griffin | G06F 21/31 |
| | | | | 726/19 |

(Continued)

*Primary Examiner* — Moustafa M Meky
*Assistant Examiner* — Elizabeth Kassa
(74) *Attorney, Agent, or Firm* — Browdy and Neimark, P.L.L.C.

(57) ABSTRACT

The present invention provides a method for real-time activation of receiver module associated or integrated with external display. The receiver device having processor and communication module for supporting streaming multimedia applications. The method comprising the steps of updating communication credentials in the receiver from the touch enabled device through direct local wireless communication network, said communication credentials support communication with external data communication network.

13 Claims, 5 Drawing Sheets

(56) References Cited

U.S. PATENT DOCUMENTS

| | | | |
|---|---|---|---|
| 2013/0201827 A1* | 8/2013 | Zhang | H04L 45/24 370/230 |
| 2014/0050083 A1* | 2/2014 | Layman | H04L 12/56 370/230 |
| 2014/0089992 A1* | 3/2014 | Varoglu | H04N 21/4122 725/81 |
| 2014/0180856 A1* | 6/2014 | Lau | G06Q 20/20 705/21 |
| 2014/0213179 A1* | 7/2014 | Rosenberg | H04W 76/14 455/41.1 |
| 2014/0273965 A1* | 9/2014 | Raleigh | H04W 12/04 455/411 |
| 2014/0321446 A1* | 10/2014 | Son | H04W 48/08 370/338 |
| 2014/0354406 A1* | 12/2014 | Fyke | G06F 21/32 340/5.83 |
| 2015/0023649 A1* | 1/2015 | Wang | H04N 21/43637 386/231 |
| 2017/0019443 A1* | 1/2017 | Conan | H04N 21/41407 |

\* cited by examiner

METHOD FOR REAL-TIME ACTIVATION OF RECEIVER MODULE

TECHNICAL FIELD

The present invention relates to the field of configuring network communication, and more particularly, to remote update of network configuration.

SUMMARY OF INVENTION

The present invention provides a method for real-time activation of receiver module associated or integrated with external display. The receiver device having processor and communication module for supporting streaming multimedia applications. The method comprising the steps of updating communication credentials in the receiver from the touch enabled device through direct local wireless communication network, said communication credentials support communication with external data communication network.

These, additional, and/or other aspects and/or advantages of the present invention are: set forth in the detailed description which follows; possibly inferable from the detailed description; and/or learnable by practice of the present invention.

The present invention provides a method for real-time supporting communication of a receiver module with an external network or external service based on data communication network which is associated or integrated with external display, said receiver device having processor and communication module for communicating with a touch enabled device through direct local communication network, said method comprising the step of: updating communication credentials in the receiver from the touch enabled device through direct local communication network, said communication credentials support communication with external data communication network.

According to some embodiments of the present invention the method further comprising the step of establishing communication with the external network based, on updated communication credentials.

According to some embodiments of the present invention the communication credentials include at least one identifying detail of the external communication network.

According to some embodiments of the present invention the communication credentials include at least one authentication detail of the external communication network.

According to some embodiments of the present invention the identifying detail of the external communication network is a code representing the external network or an address of the communication network.

According to some embodiments of the present invention the authenticating detail of the external communication network is a password associated with the external network.

According to some embodiments of the present invention the communication credentials include protocol properties or characteristics of the communication network.

The present invention provides a system for real-time supporting communication of a receiver module with an external network which is associated or integrated with external display, said receiver device having processor and communication module for communicating with a touch enabled device through direct local communication network. The system comprised of: a setting module, for updating communication credentials in the receiver from the touch enabled device through direct local communication network, said communication credentials support communication with external data communication network.

According to some embodiments of the present invention setting module is implemented at the touch enabled device.

According to some embodiments of the present invention the setting module is implemented at receiver module.

According to some embodiments of the present invention the setting module is implemented partly at receiver module and partly at the touch enabled device.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The term "touch enabled device" as used herein in this application, is defined as a mobile device having a touch screen with capability of running applications as well as streaming multimedia data to a screen that is external to the computerized mobile device (e.g. a mobile phone or a tablet device).

The term "receiver module" as used herein in this application, is defined as a processing communication module embedded in a dongle device or integrated in external screen such as TV or monitor device which support managing activating and streaming multimedia application.

The term "multimedia application" as used herein in this application, is defined as application which generate images, video or sound objects, such as video application, gaming application, chatting application or advertising.

The term "credential" as used herein in this application, is defined properties, Parameter, objects relating wired or wireless communication network, such as network address, network authenticating or verification details such as password network identifying details such as name, network protocol properties or characteristics.

Figure 1:
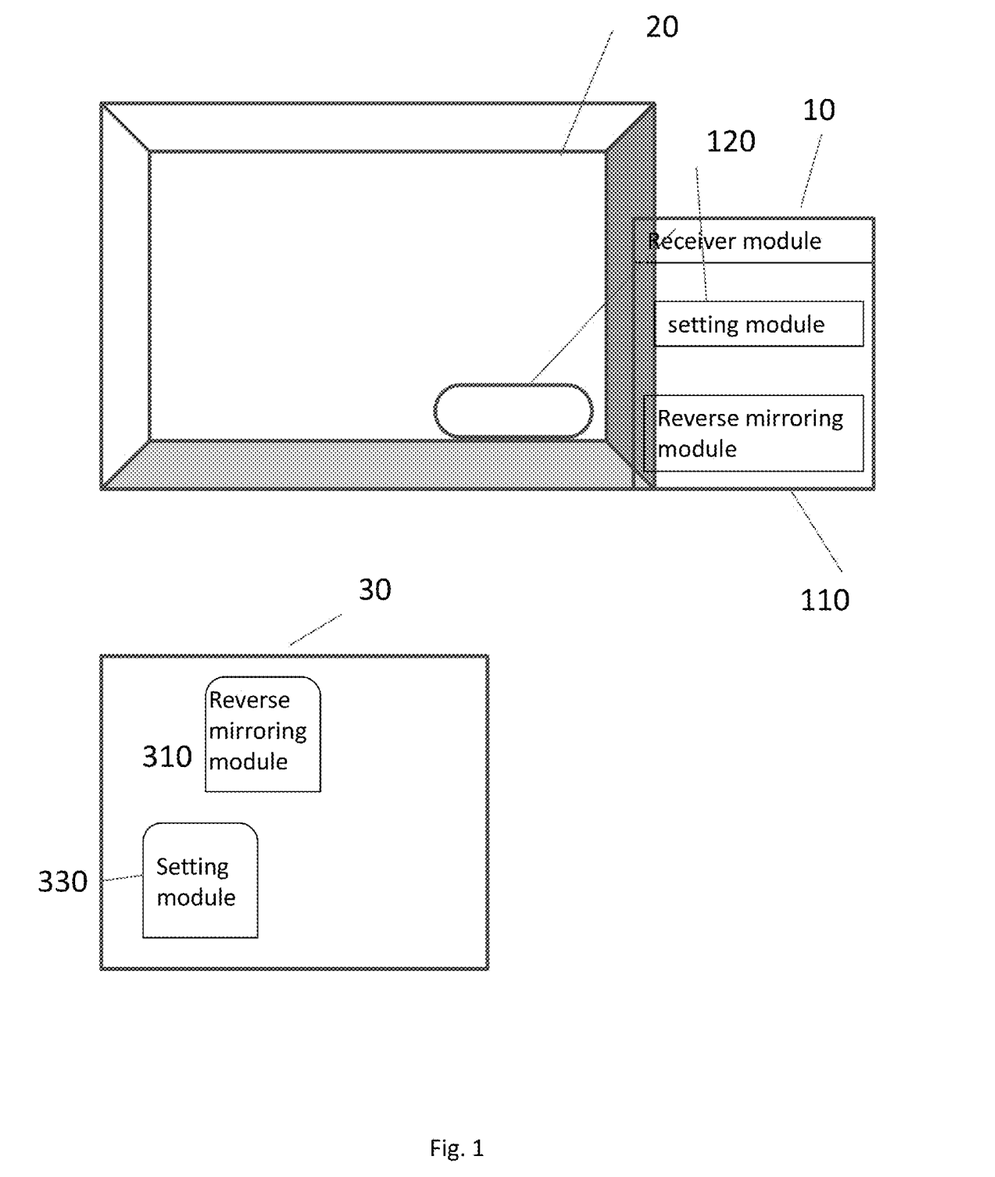
FIG. 1 is a block diagram of the system components and modules, according to some embodiments of the invention.

FIG. 1 is a block diagram of the system components and modules, according to some embodiments of the invention. The system of the present invention includes a receiver module 10 which embedded in a dongle device or integrated in external screen such as TV or monitor device. The receiver module 10 interacts with a touch enabled device, which is designated to function as interface device for the receiver module for managing multimedia applications. This interfacing interaction is enabled by mirroring modules 110, 310 for streaming back the interface of the receiver module and the running application to the touch enabled device, these modules can be implemented, partly at the receiver module or the touch enabled device or partly at the touch enabled device. Interaction modules 120, 130 support conveying input data and sensor data from the touch enabled device, to the receiver module to enable full interface functionality. These interaction modules can be implemented, partly at the receiver module or the touch enabled device or partly at the touch enabled device.

According to some embodiments of the present invention the reviver module and touch enabled device are communication through direct local wireless network such as WIFI direct, or Bluetooth. Optionally the devices are connected though global wireless or wired network using cellular network or the Internet.

According to some embodiments of the present invention it is suggest to provide setting module 330 at the touch enabled device, enabling to convey and defined communication setting at the receiver by the touch enabled device. The setting module may be implemented at the touch enabled or at the receiver module. When implemented on the receiver module, the setting module retrieves the credential from the mobile device and update the them at the receiver module for establishing communication with the external network. Optionally the setting module may be implemented partly on the mobile device and partly at the receiver module. For example, the conveying of the credential is performed at the mobile device and updating is performed at the receiver module.

Figure 2:
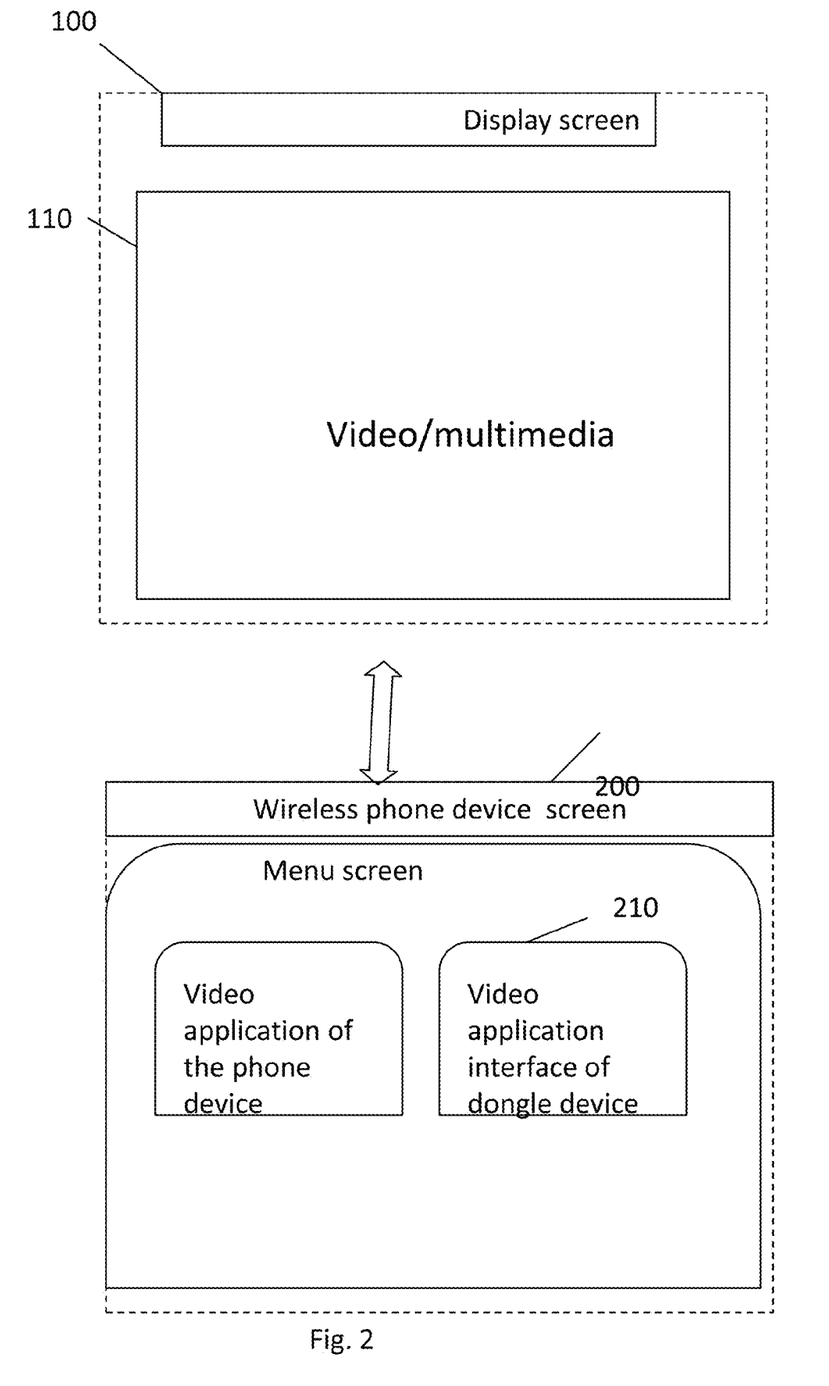
FIG. 2 shows the display screen on the touch enabled device and on an external screen, according to some embodiments of the invention.

FIG. 2 shows the display screens on the touch enabled device and on an external screen, according to some embodiments of the invention.

Figure 3:
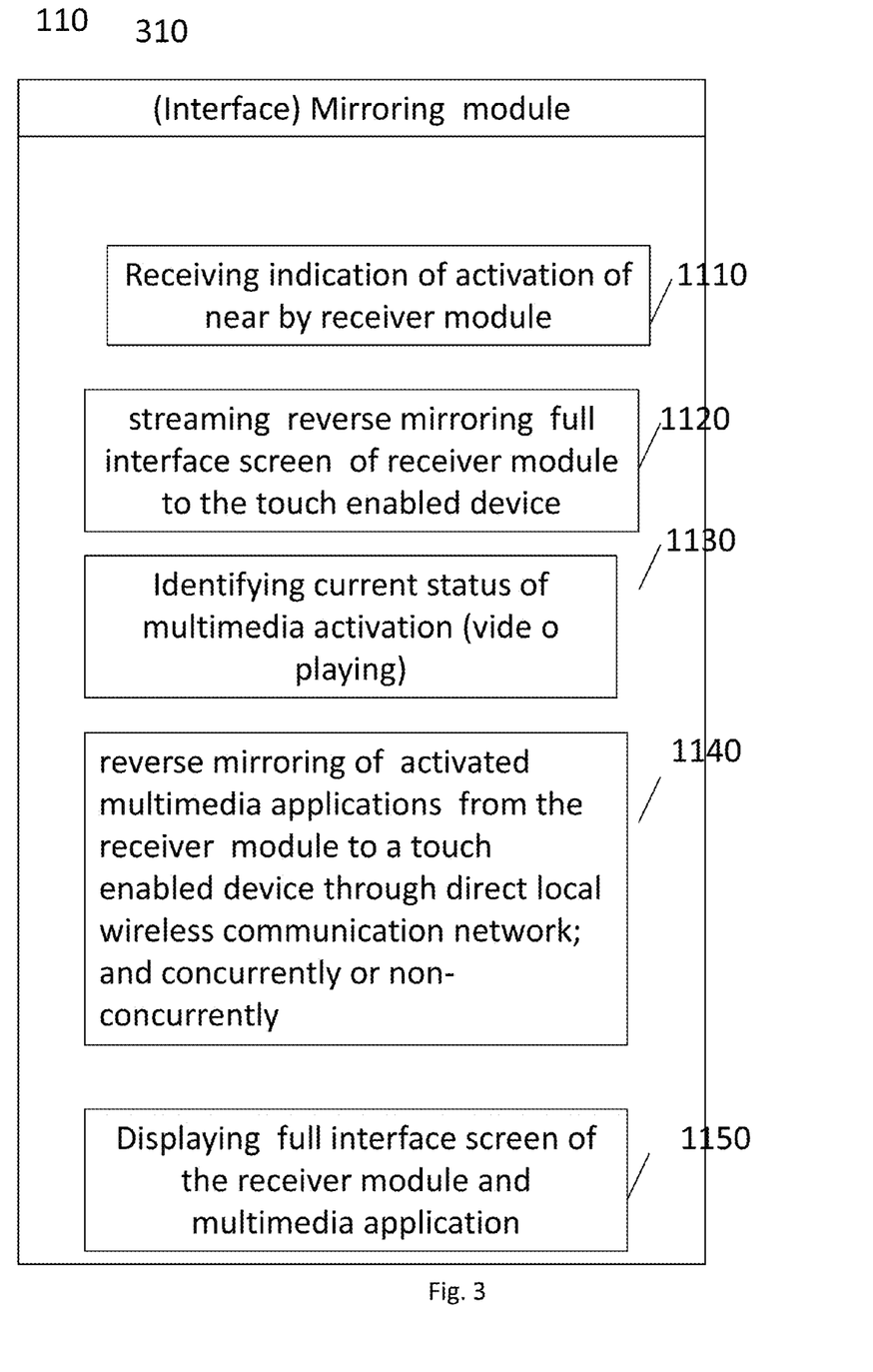
FIG. 3 is a flowchart illustrating mirroring module activities providing full mirroring of the receiver device, according to some embodiments of the invention.

FIG. 3 is a flowchart illustrating mirroring module activities providing full mirroring of the receiver device, according to some embodiments of the invention. The mirroring module functioning as a full interface, implements at least one of the following steps: Receiving indication of activation of nearby receiver module (step 1110), streaming reverse mirroring full interface screen of receiver module to the touch enabled device (step 1120), identifying current status of multimedia activation (e.g. video starts playing) (step 1130), reverse mirroring of activated multimedia applications from the receiver module to a touch enabled device through direct local wireless communication network, concurrently or non-concurrently (step 1140) and/or displaying full interface screen of the receiver module and multimedia application (step 1150) including full movie video stream or gaming video. The reverse mirroring may be implemented by WIFI direct protocols or optionally using global communication network such as TCP/IP.

Figure 4:
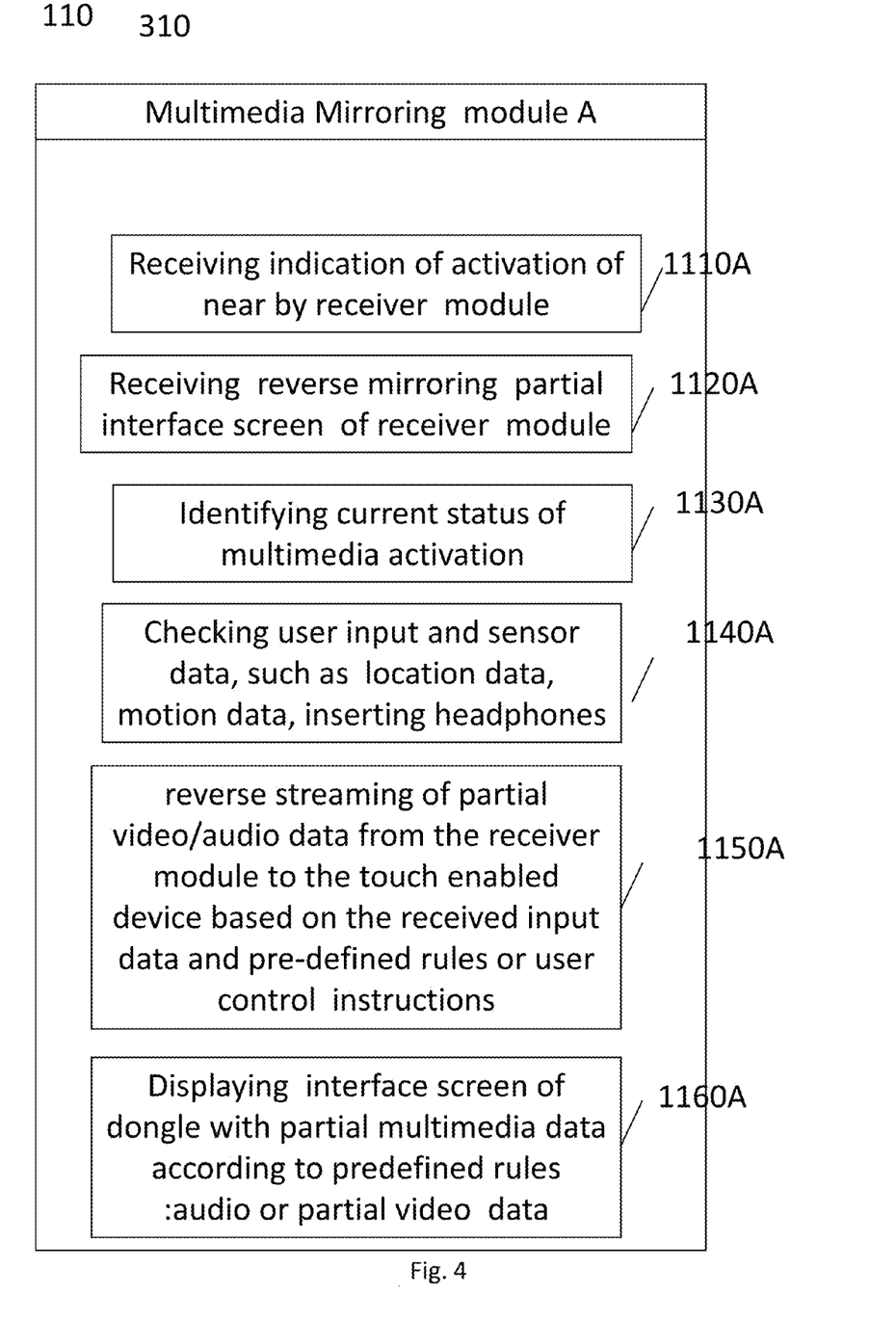
FIG. 4 is a flowchart illustrating mirroring module activities providing full mirroring of the receiver device, according to some embodiments of the invention.

FIG. 4 is a flowchart illustrating mirroring module activities providing partial mirroring of the receiver device, according to some embodiments of the invention. The mirroring module functioning as partial dynamic interface, implements at least one of the following steps: receiving indication of activation of nearby receiver module (step 1110A), receiving reverse mirroring of partial interface screen of receiver module (step 1120A), identifying current status of multimedia activation (step 1130A), checking user input and measured sensor data of the touch enabled device, such as location data, motion data or inserting headphones (step 1140A), reverse streaming of partial video/audio data from the receiver module to the touch enabled device based on the received input data and pre-defined rules or user control instructions (step 1150A) and/or displaying interface screen of the receiver module with partial multimedia data according to predefined rules 1160. The predefined rules may relate to different scenarios when using multimedia application such video and gaming application. One scenario may define to include only control functionality (e.g. pause, play) of a video application, while the video itself is displayed only on the external screen. In the same scenario it may be defined to check the location of the touch enabled device using GPS sensor embedded within the touch enabled device, incase identifying the user walked away from the external screen, based on the predefined rules it is instructed to include the video itself to be displayed on the touch enabled device, enabling the user keep viewing the streamed video when leaving the area where the external screen is not visible. According to a second scenario, it is defined to identify connection of headphone to the touch enabled device, in such case predefined rules instruct the audio stream of a video currently running on receiver to be conveyed to the touch display device. According to a third scenario, the touch enabled device is enabled to display movie subtitles, not appearing at the external display.

Figure 5:
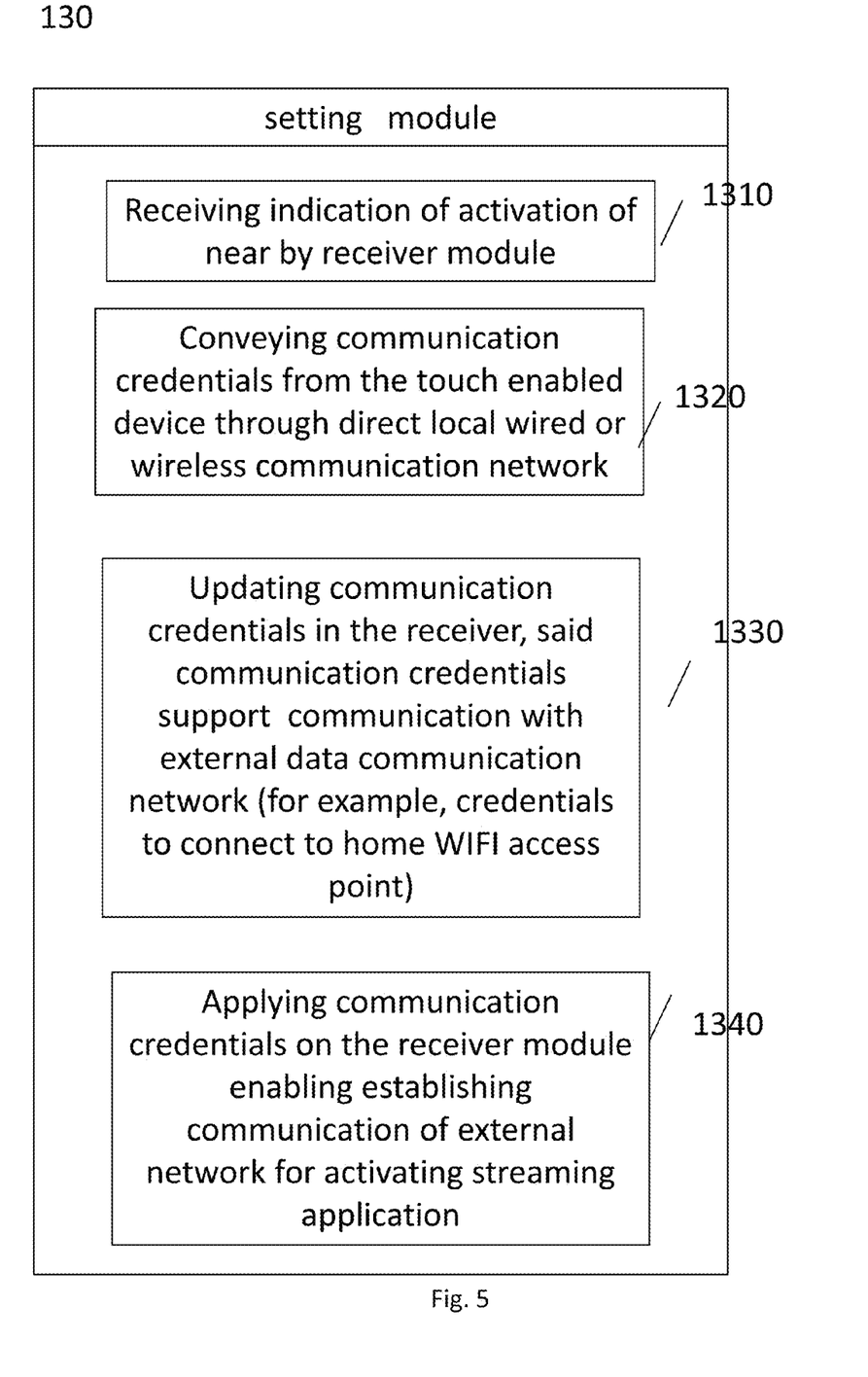
FIG. 5 is a flowchart illustrating interaction module activities providing full mirroring of the receiver device, according to some embodiments of the invention.

FIG. 5 is a flowchart illustrating setting module activities providing communication settings for the receiver device, according to some embodiments of the invention. This module implement at least one of the following steps: Receiving indication of activation of nearby receiver device (step 1310), conveying communication credentials from the touch enabled device through direct local wired or wireless communication connection or network, updating communication credentials in the receiver, said communication credentials support communication with external data communication network (for example, credentials to connect to home WIFI access point), optionally including the password for the active WIFI network) (step 1320) and/or Applying communication credentials on the receiver module enabling establishing communication of external network for activating streaming application.

The communication credentials may include: name of communication network name, address of the network, protocol properties or characteristics or authenticating properties or details.

According to other embodiments of the present invention the credential information may include identifying authenticating data for registering service over communication network, such as subscription to data or multimedia service provided over data communication network.

The direct local wireless communication connection or network may be Bluetooth based communication network, NFC communication, infrared communication or ZiGBee connection. Optionally the direct local communication may be wired connection such as USB cable, network wired connection etc.

The direct local network may be WIFI network, or wired Internet connection, or satellite connection or TV cable connection.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

What is claimed is:

1. A method for real-time support of communications between a receiver module device, a mobile, touch screen device, and an external communications network, wherein the receiver module device is configured to be affixed to an external display, wherein communications between the receiver module device and the external communications network require the receiver module device to supply a network password, said method comprising the steps of:

operating the receiver module device which is embedded in a dongle device or integrated in the external display to transmit an indication of activation through a direct local wireless connection, to receive the network password transmitted directly from the touch screen device to the receiver module device through the direct, local wireless connection, to establish the first time, according to the network password, communications with the external communications network, the receiver module device being unconnected with the external network before the receiver module supplies the network password, wherein the touch screen device is manually configured with the network password of the external communication network using the input interface of the touch screen device; and concurrently operating the touch screen device to receive from the receiver module device the indication of activation, responsively to transmit the network password of the external communication network using a setting module, directly from the touch screen device to the receiver module device through the direct, local wireless connection, and subsequently initiate a wireless connection by the receiver module with the external network using the transmitted password, wherein the setting module is implemented at the touch screen device, or is implemented at the receiver module device to retrieve the network password from the touch screen device and update the network password at the receiver module device for establishing communication with the external communications network, wherein the touch screen device and the receiver module are wirelessly connected to each other only through the direct local wireless connection, wherein the direct, local wireless connection is one of WiFi direct, Bluetooth, NFC communication, infrared communication, or ZiGBee connection.

2. The method of claim 1, further comprising operating the touch screen device to transmit, when transmitting the network password, at least one identifying detail of the external communications network.

3. The method of claim 1, further comprising operating the touch screen device to transmit, when transmitting the network password, at least one authentication detail of the external communication network.

4. The method of claim 1, further comprising operating the touch screen device to transmit, when transmitting the network password, a code representing the external network or an address of the communication network.

5. The method of claim 1, further comprising operating the touch screen device to transmit, when transmitting the network password, protocol properties or characteristics of the external communications network.

6. The method of claim 1, wherein the external communications network is a Wi-Fi network.

7. The method of claim 1, further comprising operating the receiver module device to determine the subset of the video stream and the audio stream responsively to an interaction of a user with the touch screen device.

8. The method of claim 1, further comprising operating the touch screen device to receive the subset of the video stream and the audio stream responsively to an interaction of a user with the touch screen device.

9. A system for real-time support of communications over an external communications network requiring a network password, the system comprising:

a mobile, touch screen device, configured with the network password, having a processor and a memory including instructions that when executed by the processor cause the touch screen device to receive from a receiver module device, through a direct, local wireless connection, an indication of activation of the receiver module device, and responsively to transmit the network password of the external communication network using a setting module, directly from the touch screen device to the receiver module device through the direct, local wireless connection; wherein the touch screen device is manually configured with the network password of the external communication network using the input interface of the touch screen, the receiver module device, configured to be affixed to an external display, the receiver module device being embedded in a dongle device or integrated in the external display, having a processor and a memory including instructions that when executed by the processor cause the receiver module device to receive the network password transmitted directly from the touch screen device to the receiver module device through the direct, local wireless connection, to establish for the first time, according to the network password, communications with the external communications network, the receiver module device being unconnected with the external network before the receiver module supplies the network password, and to subsequently initiate wireless communication by the receiver module with the external network using the transmitted password, and the setting module, implemented at the touch screen device, or implemented at the receiver module device to retrieve the network password from the touch screen device and update the network password at the receiver module device for establishing communication with the external communications network, wherein the touch screen device and the receiver module are wirelessly connected to each other only through the direct local wireless connection, wherein the direct, local wireless connection is one of WiFi direct, Bluetooth, NFC communication, infrared communication, or ZiGBee connection.

10. The system of claim 9, wherein the memory instructions further cause the touch screen device to transmit, when transmitting the network password, at least one identifying detail of the external communications network.

11. The system of claim 9, wherein the memory instructions further cause the touch screen device to transmit, when transmitting the network password, at least one authentication detail of the external communications network.

12. The method of claim 9, wherein the memory instructions further cause the touch screen device to transmit, when transmitting the network password, a code representing the external communications network.

13. The system of claim 9, wherein the memory instructions further cause the touch screen device to transmit, when transmitting the network password, protocol properties or characteristics of the external communications network.

* * * * *